(12) United States Patent
Sugishima et al.

(10) Patent No.: US 8,076,818 B2
(45) Date of Patent: Dec. 13, 2011

(54) ARMATURE AND ELECTRIC MOTOR HAVING THE SAME

(75) Inventors: Kazushi Sugishima, Hamamatsu (JP); Akihiko Seki, Hoi-gun (JP); Yoshihiro Mashima, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 349 days.

(21) Appl. No.: 12/461,882

(22) Filed: Aug. 27, 2009

(65) Prior Publication Data

US 2010/0052462 A1 Mar. 4, 2010

(30) Foreign Application Priority Data

Sep. 4, 2008 (JP) ................................. 2008-227327

(51) Int. Cl.
*H02K 3/48* (2006.01)
*H02K 3/34* (2006.01)
(52) U.S. Cl. ...................................................... 310/215
(58) Field of Classification Search .................... 310/43, 310/215
See application file for complete search history.

(56) References Cited

U.S. PATENT DOCUMENTS 5,428,258 A * 6/1995 Mowery ......................... 310/215
6,580,193 B2 * 6/2003 Yoshikawa et al. ........... 310/215

FOREIGN PATENT DOCUMENTS

| JP | A-2001-298917 | | 10/2001 |
| JP | 2007-135326 | * | 5/2007 |
| JP | A-2008-220059 | | 9/2008 |
| JP | 2009-027912 | * | 2/2009 |

* cited by examiner

*Primary Examiner* — Burton Mullins
(74) *Attorney, Agent, or Firm* — Posz Law Group, PLC

(57) ABSTRACT

Winding guide portions of an insulator are received in slots, respectively, of a core. Each of windings is electrically insulated from the core by a winding guide wall of a corresponding one of the winding guide portions in each of corresponding two of slots of the core. The winding guide wall of at least one of the winding guide portions is configured differently from the winding guide wall of each of the rest of the winding guide portions and includes a radial bottom wall section, which is radially outwardly spaced from a radial bottom wall section of a corresponding one of the slots by a predetermined distance and contacts a corresponding one of the windings.

11 Claims, 10 Drawing Sheets

ARMATURE AND ELECTRIC MOTOR HAVING THE SAME

CROSS REFERENCE TO RELATED APPLICATION

This application is based on and incorporates herein by reference Japanese Patent Application No. 2008-227327 filed on Sep. 4, 2008.

BACKGROUND OF THE INVENTION

1. Field of the Invention

The present invention relates to an armature and an electric motor having the same.

2. Description of Related Art

In an electric motor of, for example, a vehicular electric device, which is installed to a vehicle, an armature is rotatably supported by bearings in a yoke that has a plurality of magnets that form magnetic poles.

As an armature of such a motor, there has been proposed an armature, in which core sheets are stacked one after another to form a core and are fitted over a shaft such that the core has a plurality of generally identical T-shaped teeth and a tooth connecting portion for connecting the teeth together (see, for example, Japanese Unexamined Patent Publication No. 2001-298917A). In this armature, spaces, each of which is defined between adjacent teeth in cooperation with the tooth connecting portion, are formed as identically configured slots, and windings are wound at the slots.

The double-flyer winding method is known as a winding method for winding the windings around the above-described core from two locations, which are point symmetry about the rotational axis of the core. Specifically, this is the winding method of the following type. That is, an initial winding is placed and wound around two of the slots, which are spaced from each other by a predetermined number of teeth (or one tooth). This winding operation is executed at each of the two locations, which are point symmetry about the rotational axis of the core. Thereafter, the subject slots are sequentially changed to the adjacent ones, and the windings are wound at the subject slots in the same manner.

In the above described winding method, as shown in FIG. 12, a gap 56 may be left at a core 50 center side in each of particular slots 53b, 53g, each of which is placed at a circumferential intermediate part of a first winding (initial winding) 55a located between two circumferential ends of the first winding 25a.

That is, as indicated by dotted lines in FIG. 12, the first winding 55a has been already wound at the slot 53b, 53g located at the circumferential intermediated part of the first winding 55a and covers a radially inner part of the slot 53b, 53g by the time of winding the second winding 55b after the first winding 55a. Therefore, when the second winding 55b is wound, the gap 56 may be created at the core 50 center side in the slot 53b, 53g.

Therefore, the position of the second winding 55b, which is wound at the location on the core 50 outer peripheral side of the gap 56 in the radial direction of the core 50, as well as the position of the other winding 55e, which is wound at the location on the core 50 outer peripheral side of the second winding 55b in the radial direction of the core 50, become unstable. Furthermore, these unstable positions and states of the windings will have substantial influences on the positions and states of the subsequently wound windings. Therefore, the rotational unbalance of the armature of the motor disadvantageously occurs.

The unbalance of the armature, which is created in the winding process of the armature, may be corrected in the following balance correcting process. In the balance correcting process, a degree of dynamic unbalance of the armature is measured. When it is determined that the measured degree of the dynamic unbalance is out of the standard, the balance of the armature may be improved through subtractive or additive correction. Here, in the subtractive correction, a portion of the core, which causes the unbalance, is removed by cutting a required amount of the material therefrom through use of a cutter or a laser machine. In contrast, in the additive correction, a required additional weight is added to a portion of the winding or slot, which causes the unbalance, by applying, for example, putty thereto. These corrections require the dedicated process or dedicated facility, so that the manufacturing costs are disadvantageously increased. Also, the motor efficiency may possibly be deteriorated.

If it is possible to reduce the number of the unbalanced products, the above described balance correcting process may possibly be eliminated. However, the various factors influence the unbalancing of the armature in the winding process where the large number of the unbalanced products is generated. In order to reduce the unbalancing, it has been proposed to wind the windings to the core having the even number of the slots such that the windings are symmetrically placed on the left side and the right side of the core. However, even in this way, it is difficult to reduce the unbalancing by coinciding the states of the windings on the left side and the right side of the core.

According to a previously proposed technique, an insulator is provided to electrically insulate the windings from the metal core. The insulator is press fitted over the surface of the core to electrically insulate the windings from the metal core.

However, a gap may be disadvantageously created between the insulator and the core. Furthermore, when the windings are wound at the slots upon fitting of the insulator to the core, a portion of the insulator may possibly be deformed by a tension of the windings. As discussed above, it has been demanded to provide a technique, which limits the occurrence of the deformation or misalignment caused by the tension at the time of winding the windings.

SUMMARY OF THE INVENTION

The present invention is made in view of the above disadvantages. According to the present invention, there is provided an armature, which includes a shaft, a core, an insulator and a plurality of windings. The core is installed to the shaft and includes a plurality of teeth, which are arranged one after another in a circumferential direction of the core at generally equal angular intervals and define a plurality of slots. The insulator is installed to the core. The insulator includes a plurality of winding guide portions, which are received in the plurality of slots, respectively, and each of the plurality of winding guide portions has a winding guide wall. Each of the plurality of windings is wound in the core through corresponding two of the plurality of slots. Each of the plurality of windings is electrically insulated from the core by the winding guide wall of a corresponding one of the plurality of winding guide portions in each of the corresponding two of the plurality of slots. The winding guide wall of at least one of the plurality of winding guide portions is configured differently from the winding guide wall of each of the rest of the plurality of winding guide portions and includes a radial bottom wall section, which is radially outwardly spaced from a radial bottom wall section of the corresponding one of the plurality of slots by a predetermined distance and contacts a corresponding one of the plurality of windings. According to the present invention, there may be also provided an electric motor having the above armature.

DETAILED DESCRIPTION OF THE INVENTION

First Embodiment

A first embodiment of the present invention will be described with reference to the accompanying drawings.

Figure 1:
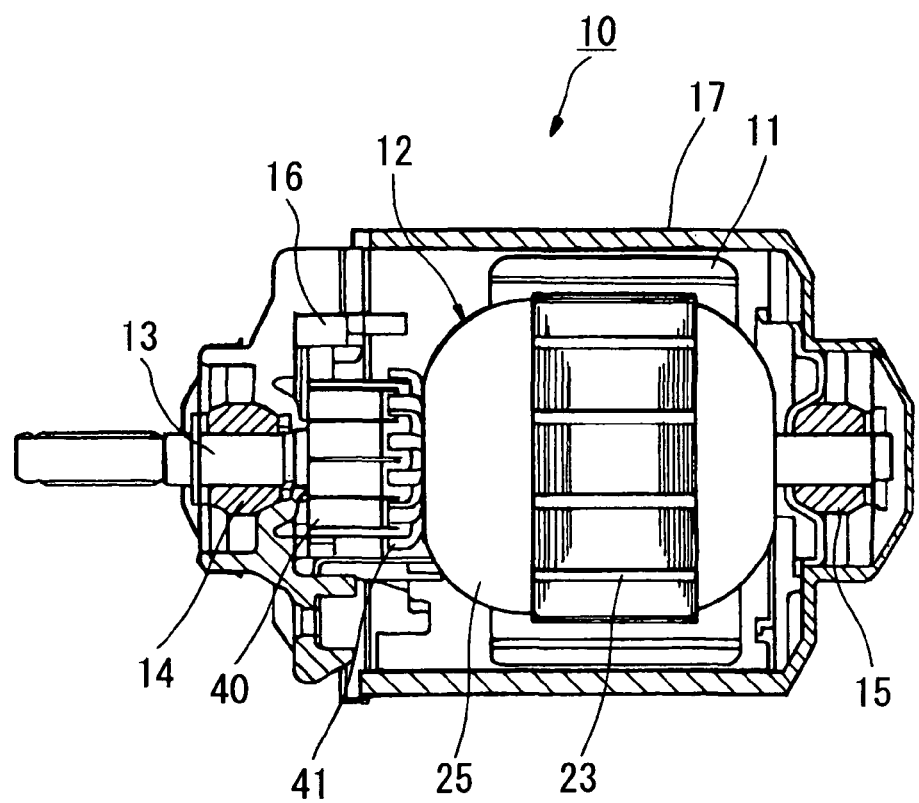
FIG. 1 is a cross sectional view of an electric motor according to a first embodiment of the present invention.

With reference to FIG. 1, an electric motor 10 of the present embodiment includes a stator 11, an armature 12, a shaft 13 of the armature 12, bearings 14, 15 and a brush apparatus 16, which are received in a housing 17. The bearings 14, 15 rotatably support the shaft 13.

Figure 2:
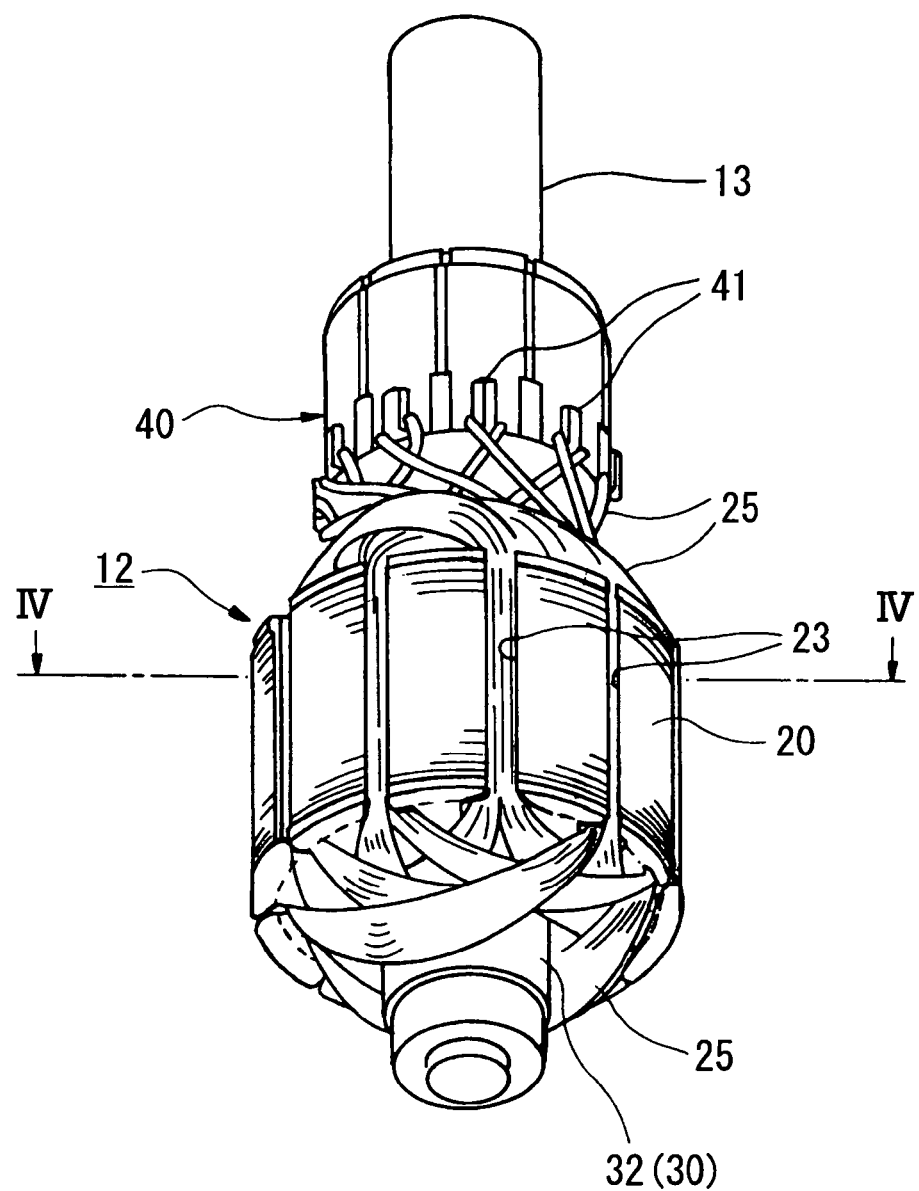
FIG. 2 is a perspective view of an armature of the motor shown in FIG. 1.

FIG. 2 is a perspective view of the armature 12. A core 20 is securely press fitted to the shaft 13.

Figure 3:
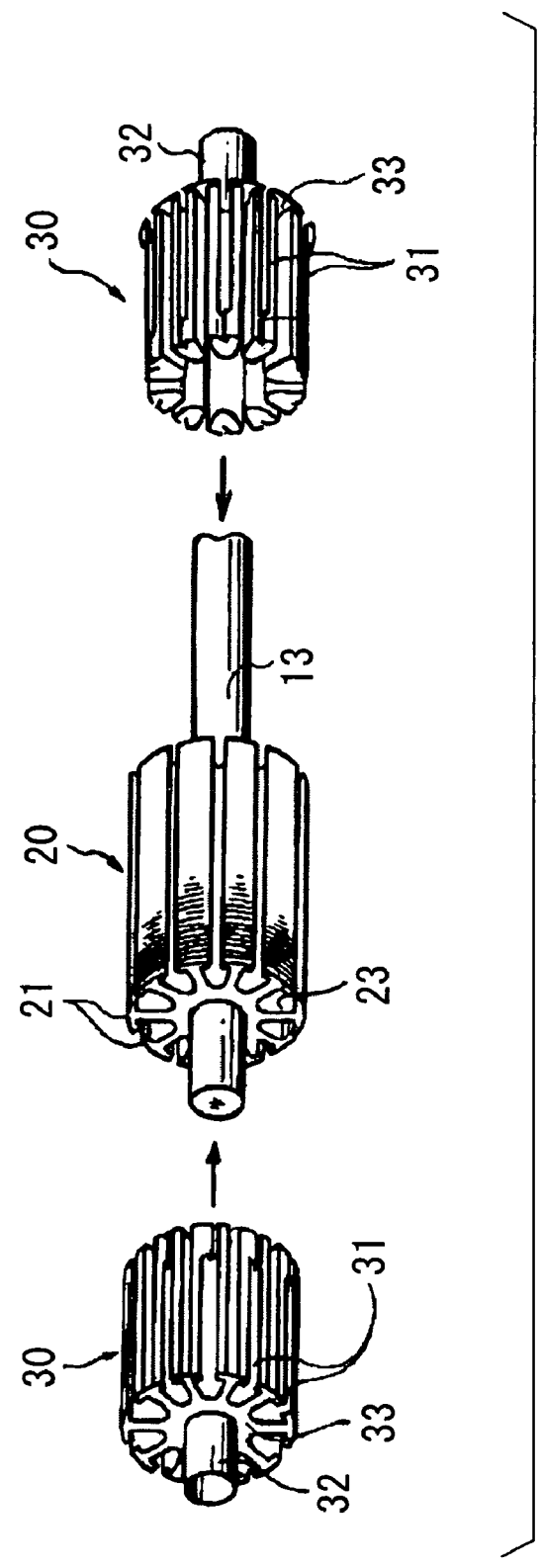
FIG. 3 is a perspective view showing a connecting state of a core and an insulator of the motor.
Figure 4:
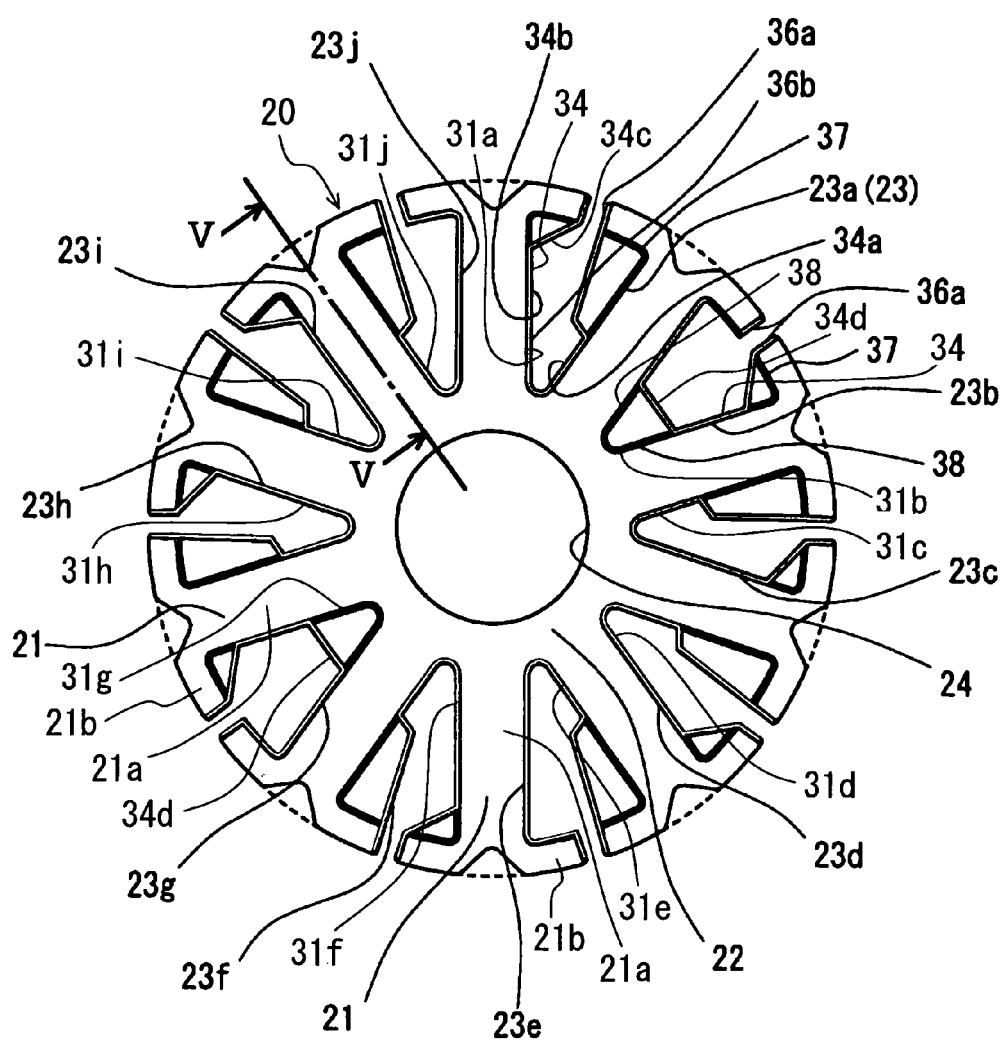
FIG. 4 is a cross-sectional view along line IV-IV in FIG. 2, showing the core and the insulator.
Figure 8:
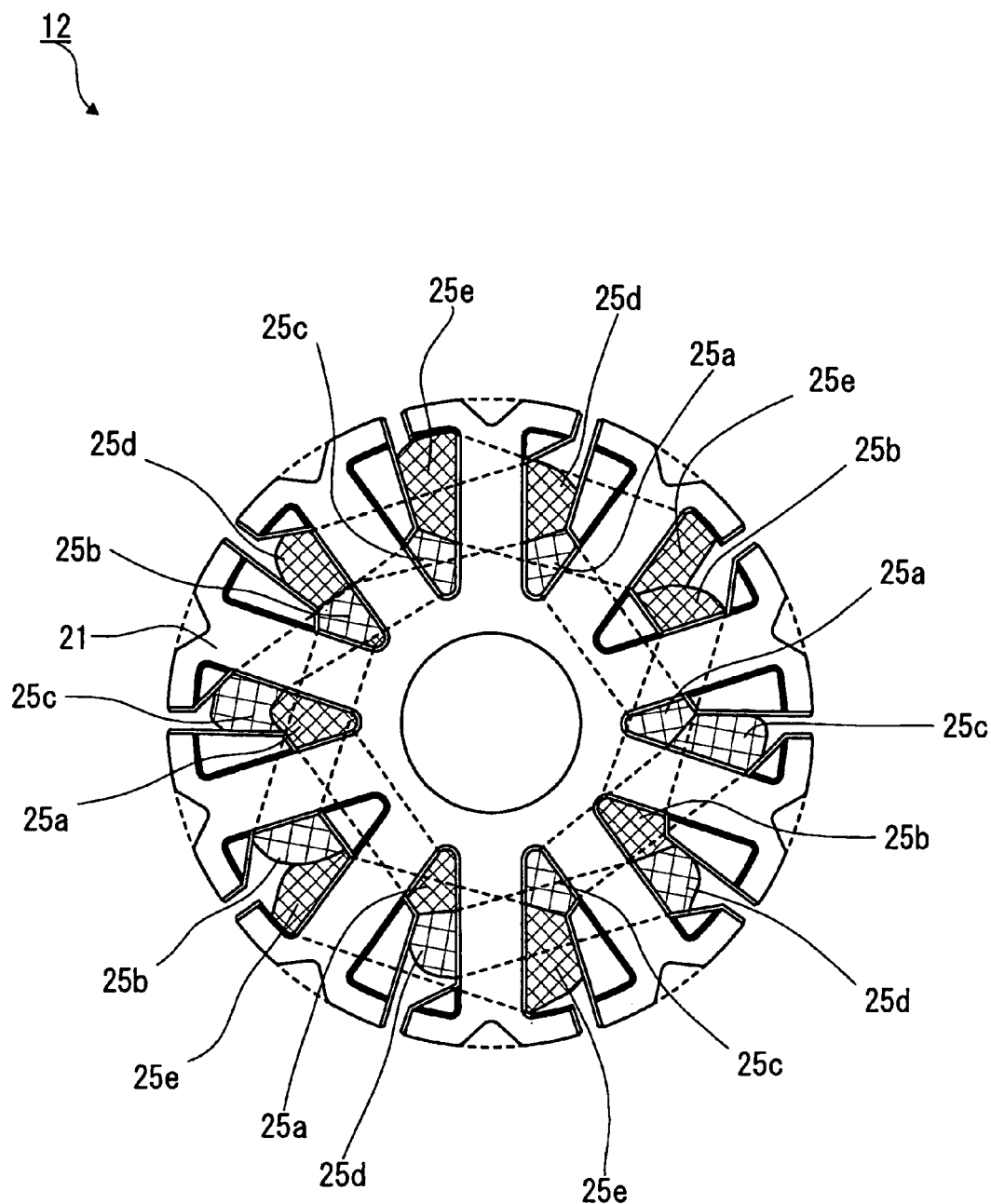
FIG. 8 is a cross-sectional view along line IV-IV in FIG. 2 showing the armature.

A plurality of core sheets is stacked one after another in an axial direction of the shaft 13 to form the core (laminate core) 20. As shown in FIG. 4, the core 20 has a through hole 24, which axially extends through a center of the core 20 and receives the shaft 13 therethrough. The core 20 has ten T-shaped teeth 21 and an annular tooth connecting portion 22. The teeth 21 are generally identically configured. Each tooth 21 has a radially elongated main body 21a and a head portion 21b. The head portion 21b of the tooth 21 is provided to a radially outer end of the main body 21a and circumferentially projects from the radially outer end of the main body 21a in both of a clockwise direction and a counterclockwise direction. The tooth connecting portion 22 connects radial bottom ends of the main bodies 21a of the teeth 21 together such that the main bodies 21a of the teeth 21 radially outwardly extend from the tooth connecting portion 22 and are arranged one after another in a circumferential direction at generally equal angular intervals. Each of a plurality of portions surrounded by the teeth 21 and the tooth connecting portion 22 is configured into a notched form. These notched portions form generally identically configured slots 23, respectively. In this embodiment, these slots 23 include first to tenth slots 23a-23j. As shown in FIG. 8, windings 25 are wound at the slots 23a-23j through a pair of generally identical insulators 30 (FIG. 3), which are installed to the core 20 from opposite axial sides, respectively. These insulators 30 may be sometimes collectively referred to as an insulator.

A commutator 40, which has a center portion made of a dielectric resin material, is fitted around one end portion of the shaft 13 (FIG. 1). Four grooves or the like are formed along an outer peripheral surface of the shaft 13 to limit relative rotation between the commutator 40 and the shaft 13 as well as disengagement between the commutator 40 and the shaft 13.

Each insulator 30 is a resin product made of a dielectric resin material. As shown in FIG. 3, the insulator 30 includes winding guide portions (winding insulating portions) 31, a shaft insulating portion 32 and a side portion 33, which are integrally molded. The winding guide portions 31 electrically insulate between the core 20 and the windings 25. A through hole axially extends through a center of the side portion 33 to receive the shaft 13 therethrough. The shaft insulating portion 32, which is configured into a cylindrical form, axially outwardly projects from the side portion 33.

Figure 6:
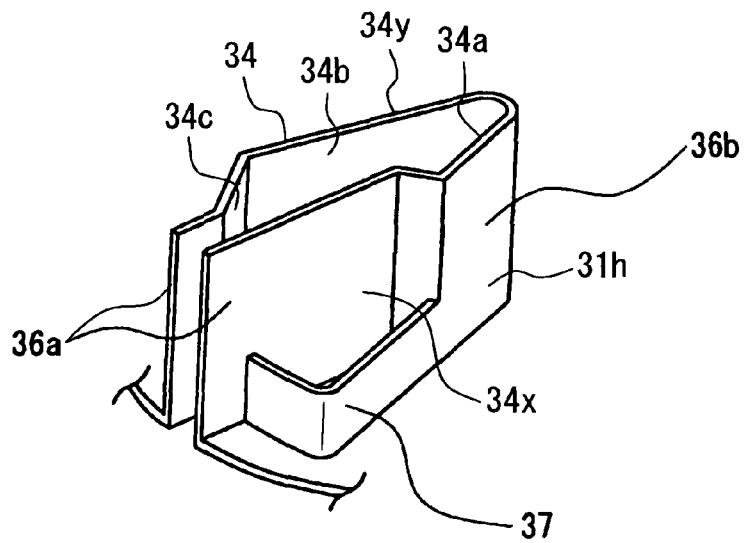
FIG. 6 is a schematic perspective view showing a primary reinforcing portion of the insulator.
Figure 7:
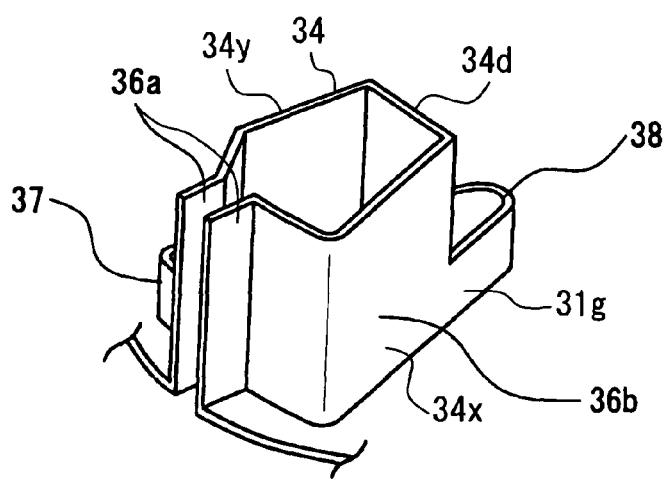
FIG. 7 is a schematic perspective view showing a secondary reinforcing portion of the insulator.
Figure 9:
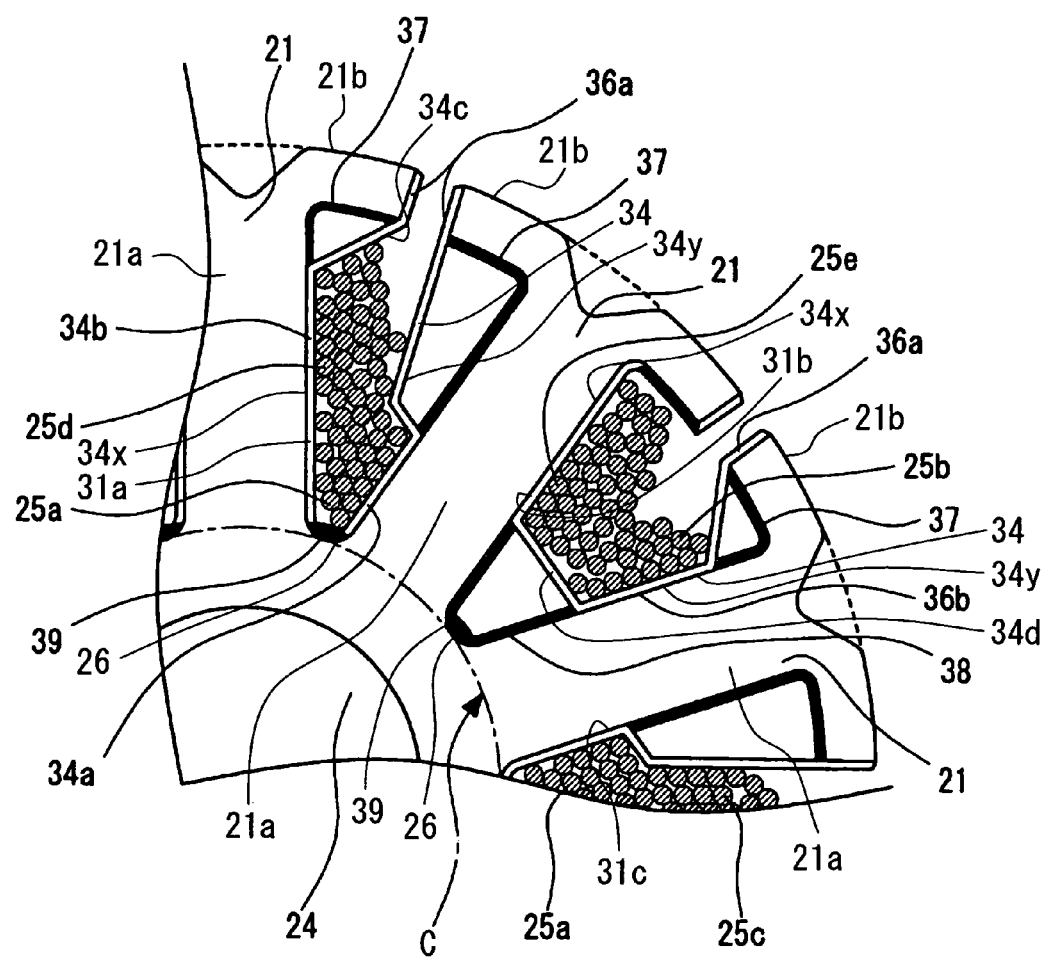
FIG. 9 is an enlarged partial cross-sectional view of a main feature of the armature shown in FIG. 8.

In the present embodiment, the winding guide portions 31 include first to tenth winding guide portions 31a-31j, as shown in FIG. 4. These winding guide portions 31a-31j are arranged one after another in the circumferential direction at generally equal angular intervals to correspond with the slots 23a-23j, respectively. Each winding guide portion 31a-31j has a generally V-shaped cross section in an imaginary plane that is perpendicular to the axis of the shaft 13. As shown in FIG. 4, each of the winding guide portions 31a-31j is installed into the corresponding one of the slots 23a-23j of the core 20 and is configured to cover an inner peripheral surface of the corresponding slot 23a-23j. Each winding guide portion 31a-31j has a winding guide wall 34 to guide each corresponding winding 25. The winding guide wall 34 electrically insulates each corresponding winding 25 from the core 20 and includes two circumferentially opposed side wall sections 34x, 34y that are connected together at a radial bottom wall section (FIGS. 6, 7, 9). The circumferentially opposed side wall sections 34x, 34y circumferentially define a winding receiving space therebetween to receive each corresponding winding 25. An axial length of each winding guide portion 31a-31j, which is measured in the axial direction of the shaft 13, is generally one half of the axial length of the core 20. As shown in FIG. 3, the insulators 30, which are generally identical to each other, are fitted to the slots 23a-23j from opposite sides, respectively, in the axial direction of the shaft 13, so that the entire inner peripheral surface of each slot 23a-23j is covered with the corresponding winding guide portion 31a-31j of the respective insulators 30.

When the insulators 30 are installed to the core 20 of the armature 12, the winding guide portions 31a-31j, the shaft insulating portions 32 and the side portions 33 of the insulators 30 cover the inner peripheral surfaces of the slots 23a-23j, the outer peripheral surface of the shaft 13 and the end surfaces of the core 20 to electrically insulate them from the windings 25.

Upon the installation of the insulators 30 and the commutator 40 to the shaft 13, the windings 25 are wound to the slots 23a-23j of the core 20 through the insulators 30 and are hooked to the hooks 41 (FIG. 1) of the commutator 40. Thereby, the insulators 30 are fixed to the shaft 13 and the core 20.

In the present embodiment, as shown in FIG. 4, the winding guide wall 34 (indicated by a hollow line) of each of the winding guide portions 31a-31j of the insulator 30 is configured differently from the inner peripheral surface of the corresponding slot 23a-23j of the core 20, as will be described in detail below. The windings 25 are wound around the armature 12 from two locations, which are diametrically opposed to each other about the central axis of the shaft 13, by a double-flyer method using first and second flyers of a double-flyer winding machine. Since the double-flyer method is used, each insulator 30 is configured to be point-symmetric about a center point of the through hole 24. Thereby, the winding guide portions 31a-31e of the insulator 30, which are respectively fitted to the slots 23a-23e, are generally geometrically identical to the winding guide portions 31f-31j of the insulator 30, which are respectively fitted to the slots 23f-23j. In other words, each of the winding guide portions 31a-31e is generally geometrically identical to the diametrically opposed one of the winding guide portions 31f-31j.

With reference to FIG. 8, the windings 25 include two sets (first and second winding sets) of first to fifth windings 25a-25e, which are wound to the corresponding slots 23a-23j (see FIG. 4) in this order. The first set of the first to fifth windings 25a-25e is wound with the first flyer of the double-flyer winding machine from the one location, and the second set of the first to fifth windings 25a-25e is wound with the second flyer of the double-flyer winding machine from the other location. The first winding (initial winding) 25a of the first winding set is wound a predetermined number of times between its initial winding slot 23a and another slot 23c, which are circumferentially spaced from each other by one slot. In other words, the winding 25a is circumferentially wound in the core 20 through the corresponding two slots 23a, 23c. At the same time, the first winding 25a of the second winding set is wound in the same manner starting from the slot 23f, which is circumferentially displaced from the slot 23a by 180 degrees. That is, the winding operations are executed at the two sides, which are circumferentially displaced from each other by 180 degrees. Then, the winding operation proceeds to the next slot, and the second to fifth windings 25b-25e of each winding set are sequentially wound one after another by sequentially shifting the subject slots in the counter-clockwise direction.

As shown in FIG. 8, in each of the slots 23a-23j, a first layer of the winding, which is placed on a through hole 24 side in the slot 23a-23j, and a second layer of the winding, which is placed on an outer side of the first layer of the winding in the radial direction of the core 20, are stacked one after another in the radial direction to form the two layers of the windings in the winding receiving space defined by the winding guide wall 34 of the corresponding winding guide portion 31a-31j.

As shown in FIGS. 4 and 8-9, one of the side wall sections 34x, 34y of the winding guide wall 34 of each of the first, third to sixth and eighth to tenth winding guide portions 31a, 31c-31f, 31h-31j defines a recess 34a, which is formed in a through hole 24 side part of the corresponding side wall section 34x, 34y of the winding guide wall 34 possibly in corporation with the radial bottom wall section of the winding guide wall 34. A corresponding one of the windings 25a-25c is wound as the first layer of the winding in the recess 34a. Each recess 34a is circumferentially recessed from the circumferential center of the corresponding slot 23a, 23c-23f, 23h-23j toward the winding location of the other corresponding one of the slots 23a-23j, at which the winding 25a-25c extending from the above-described recess 34a is wound. A portion of the winding 25a-25c, which forms the first layer of the winding, is received in the recess 34a.

Furthermore, the other one of the side wall sections 34x, 34y of the winding guide wall 34 of each of the first, third to sixth and eighth to tenth winding guide portions 31a, 31c-31f, 31h-31j defines another recess 34b at the location radially apart from the through hole 24 in the corresponding one of the slots 23a, 23c-23f, 23h-23j. A corresponding one of the windings 25c-25e is wound as the second layer of the winding in the recess 34b. The recess 34b is circumferentially recessed from the circumferential center of the corresponding slot 23a, 23c-23f, 23h-23j toward the winding location of the other corresponding one of the slots 23a-23j, at which the winding 25c-25e extending from the above-described recess 34b is wound. The recess 34b extends along the radial thickness of the first layer of the winding and the radial thickness of the second layer of the winding. That is, the recess 34b receives the corresponding one of the windings 25c-25e, which forms the second layer of the winding, and a portion of the corresponding one of windings 25a-25c, which forms the first layer of the winding.

A surface of the corresponding side wall section 34x, 34y of the winding guide wall 34 of each corresponding one of the winding guide portions 31a, 31c-31f, 31h-31j of the insulator 30, which is located on the outer side of the recess 34b in the radial direction of the core 20, is formed as a guide 34c that guides the corresponding one of the windings 25c-25e, which forms the second layer of the winding. The guide 34c is formed to extend obliquely relative to the adjacent circumferential side surface of the corresponding slot 23a, 23c-23f, 23h-23j. A through hole 24 side radial end portion of the guide 34c is located on a through hole 24 side of a core 20 outer peripheral side radial end portion of the second layer of the winding 25c-25e in the radial direction of the core 20. Furthermore, a core 20 outer peripheral side radial end portion of the guide 34c is located on the core 20 outer peripheral side of the core 20 outer peripheral side end portion of the second layer of the winding 25c-25e. The core 20 outer peripheral side radial end portion of the second layer of the winding 25c-25e contacts the guide 34c. The guide 34c limits removal of the corresponding winding 25c-25e from the corresponding one of the slots 23a, 23c-23f, 23h-23j.

In each of the second and seventh slots 23b, 23g, which is circumferentially positioned at the circumferential intermediate part of the first winding 25a between two circumferential ends of the first winding 25a, the winding guide wall 34 of the corresponding winding guide portion 31b, 31g forms the radial bottom (radial bottom wall section) 34d at the location that is circumferentially between the side wall sections 34x, 34y. The radial bottom 34d is radially outwardly spaced from the radial bottom (radial bottom wall section) 26 of the corresponding one of the slots 23b, 23g by a predetermined distance. Thereby, the radial bottom 34d is radially outwardly displaced from through hole 24 side radial bottoms of the winding guide walls 34 of the other winding guide portions 31a, 31c-31f, 31h-31j. The radial bottom 34d of the winding guide portion 31b, 31g generally circumferentially extends along an imaginary line, which is located on the core 20 outer peripheral side of the first winding 25a, i.e., which is located on the radially outer side of the first winding 25a.

As discussed above, in the insulator 30 of the present embodiment, the recess 34a, the recess 34b and/or the guide 34c are defined by the winding guide wall 34 in each corresponding one of the first, third to sixth and eighth to tenth winding guide portions 31a, 31c-31f, 31h-31j. Furthermore, the radial bottom 34d is defined by the winding guide wall 34 in the second and seventh winding guide portions 31b, 31g. As discussed above, the configurations of the winding guide walls 34 of these winding guide portions 31a-31j of the insulator 30 are different from the configurations of the slots 23a-23j of the core 20, which are generally identically configured.

Furthermore, each of the winding guide portions 31a-31j of the insulator 30 has two circumferentially opposed inlet walls 36a, which occupy an inlet side part of the corresponding slot 23a-23j. Each inlet wall 36a is formed at a location, which is adjacent to the corresponding head portion 21b of the corresponding tooth 21 but is apart from the main body 21a of the corresponding tooth 21. In each winding guide portion 31a-31j, an expanded slot wall portion 36b of the winding guide portion 31a-31j extends from the two circumferentially opposed inlet walls 36a to form the corresponding winding guide wall 34. A primary reinforcing wall (a primary reinforcing portion, which is also referred to as a radially outer side reinforcing portion or wall and is indicated with a bold line in FIG. 4) 37 is formed in each of the winding guide portions 31a-31j to act like a spacer at each corresponding location between the corresponding inlet wall 36a and the main body 21a of the corresponding tooth 21 (the recess 34a, the recess 34b, the guide 34c). Each primary reinforcing wall 37 extends from the corresponding inlet wall 36a along the head portion 21b of the corresponding tooth 21, as indicated by the bold line in FIG. 4. That is, the primary reinforcing wall 37 extends from the inlet wall 36a at the circumferential end of the head portion 21b of the corresponding tooth 21 to the main body 21a of the tooth 21 and joins to the winding guide wall 34.

The primary reinforcing wall (the primary reinforcing portion) 37 limits deformation of a portion of the insulator 30, which would be otherwise caused by the tension of the corresponding winding 25 at the time of winding this winding 25 to the corresponding slot 23 after the installation of the insulator 30 to the core 20. As shown in FIG. 4, the primary reinforcing wall (the primary reinforcing portion) 37 is formed to act like the spacer at each corresponding location between the corresponding inlet wall 36a and the main body 21a of the corresponding tooth 21 (the recess 34a, the recess 34b, the guide 34c).

Figure 5:
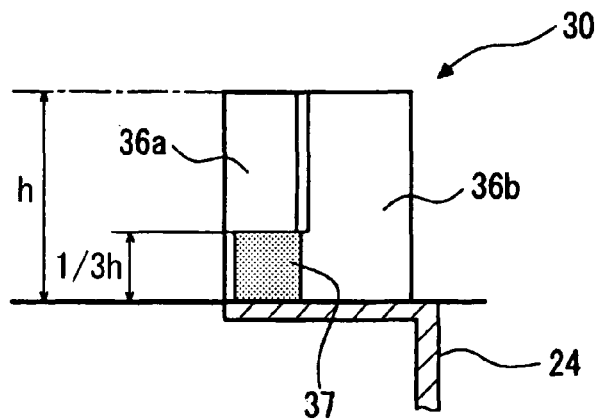
FIG. 5 is a cross-sectional view along line V-V in FIG. 4.

Specifically, when the primary reinforcing wall 37 is configured to coincide with the shape of the corresponding slot 23a-23j along the inner peripheral surface of the corresponding slot 23, it is possible to limit the deformation of the corresponding inlet wall 36a toward the tooth 21 side upon engagement between the primary reinforcing wall 37 and the surface of the corresponding tooth 21. The primary reinforcing wall 37 may be configured as a frame body, which defines a hollow interior relative to the winding guide wall 34 (indicated with the hollow line in FIG. 4) as shown in FIG. 6, or may be configured as a solid resin body with the solid interior, which fills the space between the winging guide wall 34 and the circumferential side wall of the main body 21a of the corresponding tooth 21. Furthermore, the length (axial height, i.e., axial extent) of the axial end portion of the inlet wall 36a and the length (axial height, i.e., axial extent) of the end portion of the primary reinforcing wall 37 are not necessary the same like in the present embodiment. That is, it is only required to have the height of the additional wall, which can sufficiently limit the deformation of the insulator 30. In the present embodiment, as shown in FIG. 5, the height (axial extent) of the primary reinforcing wall 37 is about one third of the height h of the inlet wall 36a (and thereby of the winding guide wall 34). However, it should be understood that the height of the primary reinforcing wall 37 may be set to be the same as the height h of the inlet wall 36a, if desired.

Furthermore, in the present embodiment, as shown in FIG. 7, a secondary reinforcing wall (a secondary reinforcing portion, which is also referred to as a radially inner side reinforcing portion or wall and is indicated with a bold line in FIG. 4) 38 is formed in a part of the corresponding winding guide portion 31b, 31g of the insulator 30 at the location where the radial bottom 34d of the winding guide wall 34 is provided.

More specifically, the secondary reinforcing wall 38 is radially positioned between the radial bottom 34d and the through hole 24 side radial bottom 26 of the corresponding slot 23b, 23g. The secondary reinforcing wall 38 is configured to the shape, which coincides with the slot's radial bottom 26 and extends along the slot's radial bottom surface, so that the secondary reinforcing wall 38 can limit the deformation of the portion of the insulator 30 that would be otherwise caused by the tension of the winding 25.

Similar to the primary reinforcing wall 37, it is not absolutely necessary to coincide the height of the secondary reinforcing wall 38 with the axial height of winding guide wall 34 of the insulator 30, which defines the slot 23. That is, it is only required that the secondary reinforcing wall 38 has the height, which can limit the deformation of the insulator 30. Also, it is not necessary to coincide the height of the primary reinforcing wall 37 with the height of the secondary reinforcing wall 38. Furthermore, similar to the primary reinforcing wall 37, the secondary reinforcing wall 38 may be configured as a frame body, which defines a hollow-interior relative to the winding guide wall 34 (indicated with the hollow line in FIG. 4) as shown in FIG. 7, or may be configured as a solid resin body with the solid interior, which fills the space between the winging guide wall 34 and the through hole 24 side radial bottom 26 of the corresponding slot 23b, 23g.

Furthermore, as shown in FIG. 9, preferably, a reference projection 39 may be formed in each of the winding guide portions 31a-31j at the radial bottom (radial bottom wall section) of the winding guide portion 31a-31j. Specifically, in the case of the winding guide portions 31b, 31g, the reference projection 39 may be formed in the radial bottom (radial bottom wall section) of the secondary reinforcing wall 38, to which the radial bottom 26 of the slot 23 of the core 20 engages. In the case of the winding guide portions 31a, 31c-31f, 31h-31j, the reference projection 39 may be formed in the radial bottom (radial bottom wall section) of the winding guide wall 34. When the insulator 30 is installed to the core 20, the reference projection 39 may be scraped by the radial bottom 26 of the corresponding slot 23a-23j of the core 20 and serves as a reference point that is positioned generally along an imaginary circle C shown in FIG. 9 to set the radial position of the corresponding winding guide portion 31a-31j of the insulator 30. The reference projection 39 is used not only for setting the reference point positioned generally along the imaginary circle C but is also used for limiting the deformation of the entire insulator 30.

In the present embodiment, each winding 25 is wound at the corresponding two slots, which are circumferentially spaced from each other by the one slot. Alternatively, in the case where each winding 25 is wound between corresponding two slots, which are circumferentially spaced from each other by two or more slots, these two or more slots may be surrounded by the second winding 25b and the subsequent winding(s) besides the first winding 25a. Therefore, in such a case, the radial bottom 34d of the winding guide wall 34 of the corresponding winding guide portion 31b, 31g of the insulator 30, which is received in the subject slot 23b, 23g located at the circumferential intermediate part of the first winding 25a, should be further radially outwardly placed along or radially outward of an imaginary line located radially outward of every one of the windings 25, which are wound before starting of the winding operation of the winding at the subject slot 23b, 23g located at the circumferential intermediate part of the first winding 25a.

In the present embodiment, all of the teeth 21 of the core 20 are identically configured, and the recesses 34a, 34b are provided only to the insulator 30. Furthermore, the radial bottom 34d of the corresponding winding guide portion 31b, 31g of the insulator 30 received in the corresponding slot 23b, 23g is radially outwardly displaced from the radial bottoms of the other winding guide portions 31a, 31c-31f, 31h-31j of the insulator 30 respectively received in the other slots 23a, 23c-23f, 23h-23j other than the slots 23b, 23g. Therefore, all of the slots 23a-23j of the core 20 can be identically configured. As a result, the core sheets of the core 20 can be stacked such that each core sheet or a group of core sheets is circumferentially displaced relative to the previous one at the time of stacking the core sheets of the core 20 in the manufacturing process of the core 20. In this way, the rotating unbalance of the armature 12, which could be generated due to a deviation in the core sheet thickness, may be reduced.

Second Embodiment

Now, a second embodiment of the present invention will be described with reference to FIGS. 10 and 11. In the following discussion, components, which are similar to those of the first embodiment, will be indicated by the same reference numerals and will not be further discussed for the sake of simplicity.

In the first embodiment, as shown in FIG. 4, the insulator 30 has the recesses 34a, 34b. Alternatively, in the second embodiment, as shown in FIG. 10, the insulator 30 is configured without providing the recesses 34a, 34b therein, and the radial bottom 34d of each the winding guide portions 31b, 31g of the insulator 30 received in the corresponding slot 23b, 23g is radially outwardly displaced from the radial bottoms of the other winding guide portions 31a, 31c-31f, 31h-31j of the insulator 30. Even in such a case, when the secondary reinforcing wall 38 is formed in each corresponding winding guide portion 31b, 31g of the insulator 30, it is possible to limit the deformation of the insulator 30 or the positional deviation of the insulator 30 relative to the core 20, which would be otherwise caused by the tension of the windings or the assembling operation. In this way, it is possible to control the positions of the windings in the intended manner. Furthermore, similar to the first embodiment, the reference projection 39 may be formed in the radial bottom of each of the winding guide portions 31a-31j of the insulator 30, to which the radial bottom 26 of the corresponding slot 23a-23j of the core 20 engages.

Figure 10:
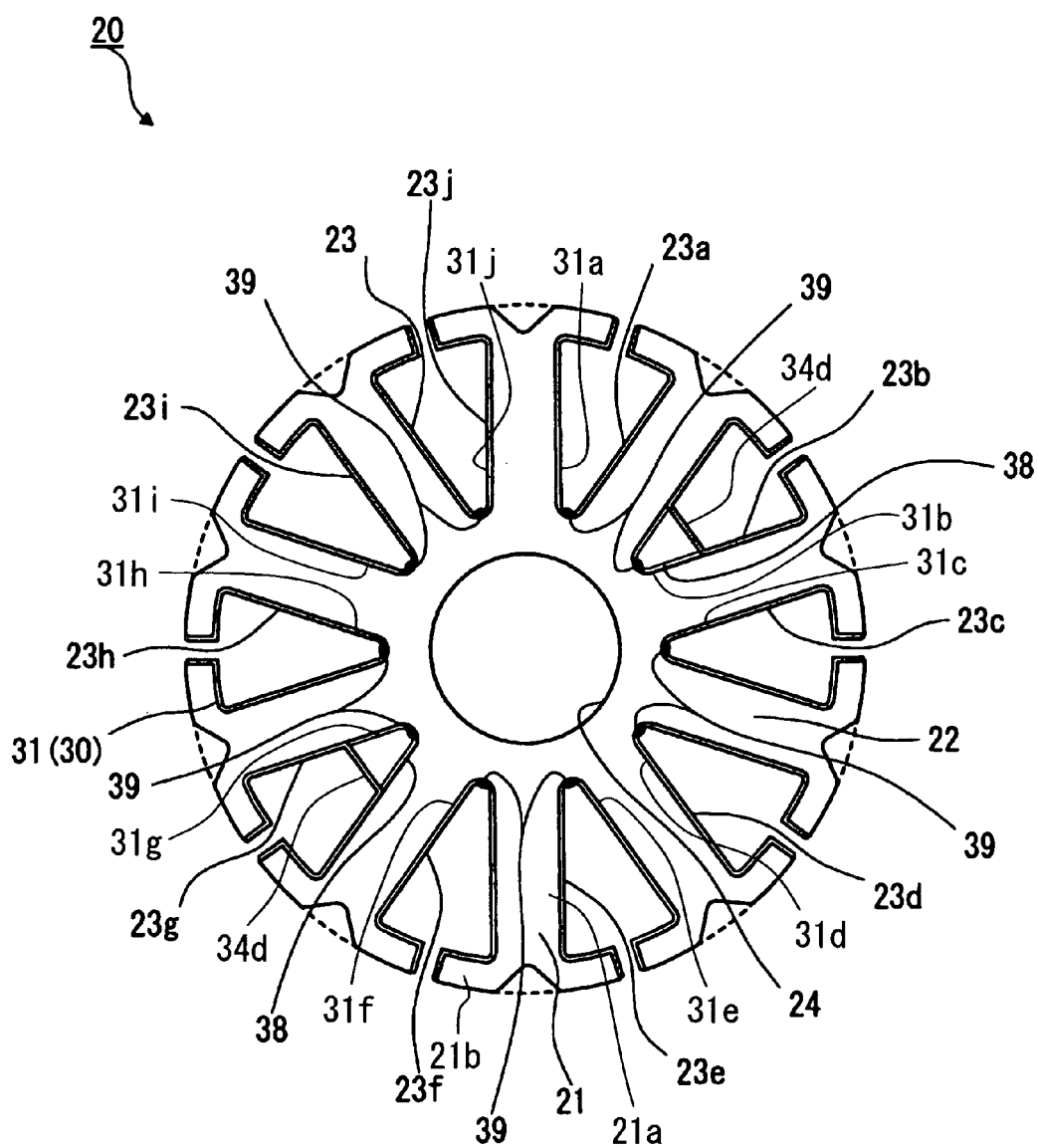
FIG. 10 is a cross-sectional view similar to FIG. 4, showing a core and an insulator of an electric motor according to a second embodiment of the present invention.
Figure 11:
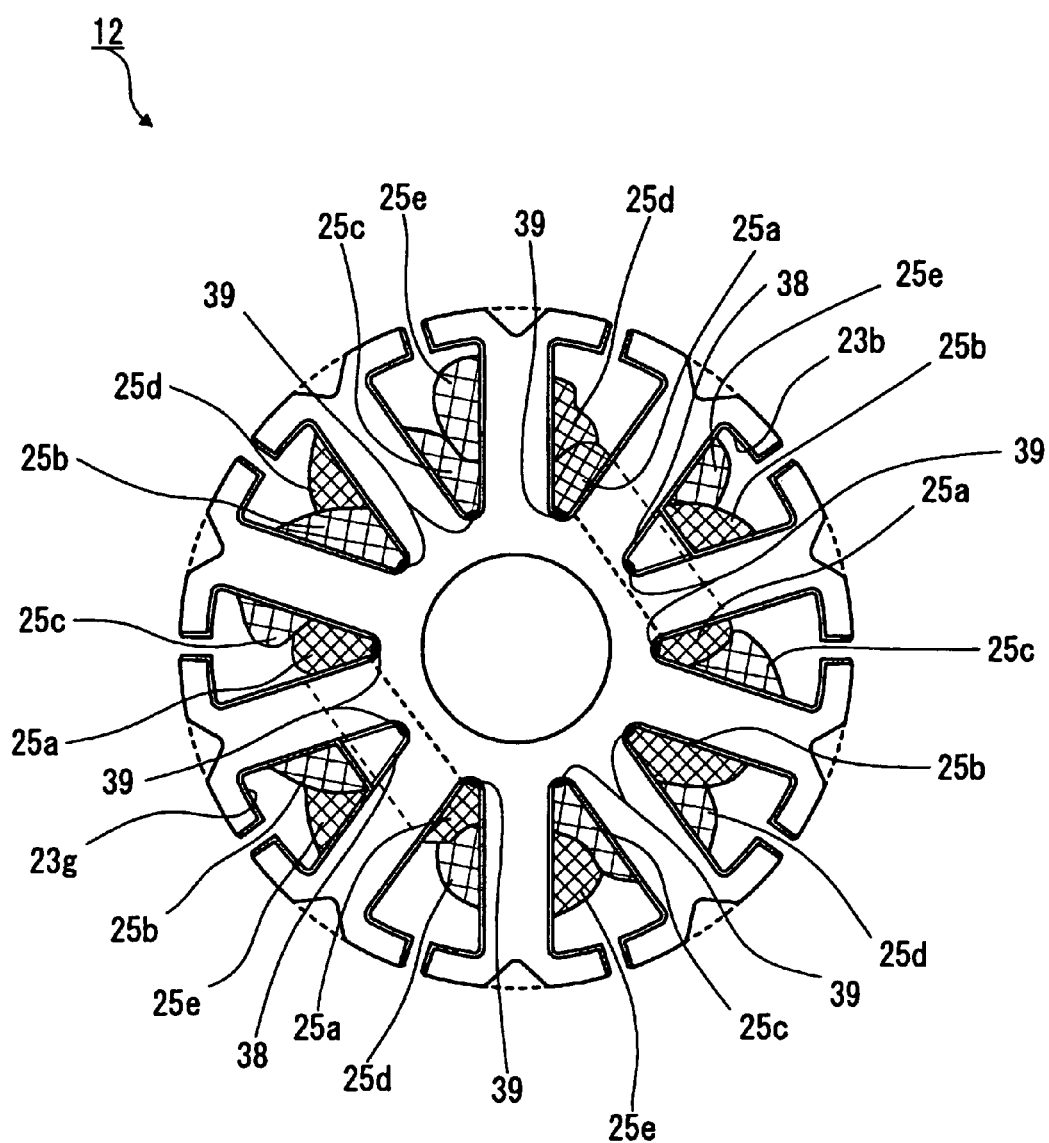
FIG. 11 is a cross-sectional view similar to FIG. 8 showing an armature of the second embodiment.
Figure 12:
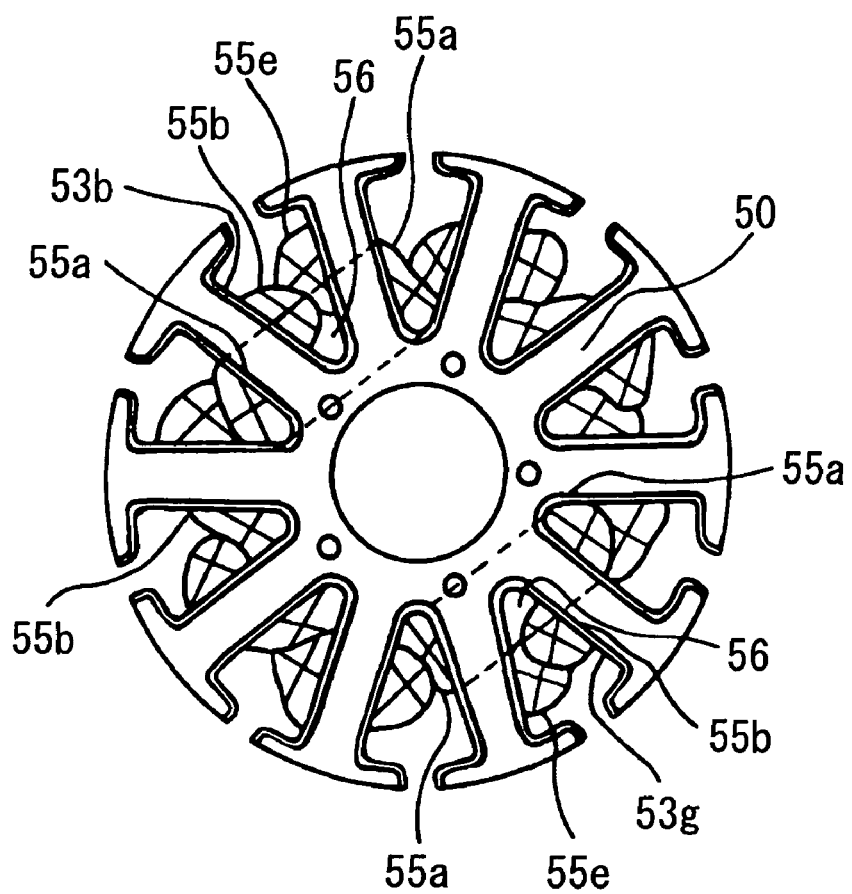
FIG. 12 is a schematic view showing a prior art armature.

In the case of FIG. 10, as shown in FIG. 11, in each of the slots 23b, 23g located at the circumferential intermediate part of the first winding 25a, the radial bottom 34d of the winding guide wall 34 of the corresponding winding guide portion 31b, 31g of the insulator 30 is radially outwardly displaced from the radial bottoms of the other winding guide portions 31a, 31c-31f, 31h-31j. In this way, the first layer of the winding 25b in the slot 23b, 23g contacts the radial bottom 34d of the winding guide wall 34 of the winding guide portion 31b, 31g of the insulator 30 received in the slot 23b, 23g. Therefore, in all of the slots 23a-23j, the corresponding one of the windings 25a-25e contacts the through hole 24 side radial bottom surface of the winding guide wall 34 of the corresponding winding guide portion 31a-31j of the insulator 30 received in the slot 23a-23j. As a result, it is possible to limit the occurrence of the unstable state of the windings 25a-25e, which would be otherwise caused by the gap between the first layer of the winding 25a-25c and the radial bottom surface of the winding guide wall 34 of the corresponding winding guide portion 31a-31j of the insulator 30 received in the slot 23a-23j. As a result, the rotating balance of the armature 12 can be improved.

Additional advantages and modifications will readily occur to those skilled in the art. The invention in its broader terms is therefore not limited to the specific details, representative apparatus, and illustrative examples shown and described.

What is claimed is:

1. An armature comprising:
a shaft;
a core that is installed to the shaft and includes a plurality of teeth, which are arranged one after another in a circumferential direction of the core at generally equal angular intervals and define a plurality of slots;
an insulator that is installed to the core, wherein the insulator includes a plurality of winding guide portions, which are received in the plurality of slots, respectively, and each of the plurality of winding guide portions has a winding guide wall; and
a plurality of windings, each of which is wound in the core through corresponding two of the plurality of slots, wherein:
each of the plurality of windings is electrically insulated from the core by the winding guide wall of a corresponding one of the plurality of winding guide portions in each of the corresponding two of the plurality of slots; and
the winding guide wall of at least one of the plurality of winding guide portions is configured differently from the winding guide wall of each of the rest of the plurality of winding guide portions and includes a radial bottom wall section, which is radially outwardly spaced from a radial bottom wall section of the corresponding one of the plurality of slots by a predetermined distance and contacts a corresponding one of the plurality of windings.

2. The armature according to claim 1, wherein another corresponding one of the plurality of windings is radially positioned between the radial bottom wall section of the winding guide wall of the at least one of the plurality of winding guide portions and the shaft.

3. The armature according to claim 1, wherein the at least one of the plurality of winding guide portions further includes a radially inner side reinforcing portion, which radially inwardly extends from the radial bottom wall section of the winding guide wall and is engaged with the radial bottom wall section of the corresponding one of the plurality of slots.

4. The armature according to claim 3, wherein a hollow space is defined between the radially inner side reinforcing portion and the radial bottom wall section in the at least one of the plurality of winding guide portions.

5. The armature according to claim 3, wherein an axial extent of the radially inner side reinforcing portion is smaller than that of the radial bottom wall section of the winding guide wall.

6. The armature according to claim 1, wherein:
each of the plurality of teeth includes a radially elongated main body and a head portion;
the head portion of each of the plurality of teeth is provided to a radially outer end of the radially elongated main body of the tooth and circumferentially projects from the radially outer end of the radially elongated main body in both of clockwise direction and counterclockwise direction; and
at least another one of the plurality of winding guide portions includes a radially outer side reinforcing portion that extends from a circumferential end of the head portion of a corresponding one of the plurality of teeth to the radially elongated main body of the corresponding one of the plurality of teeth and joins to the winding guide wall of the winding guide portion.

7. The armature according to claim 6, wherein a hollow space is defined between the radially outer side reinforcing portion and the winding guide wall in the at least another one of the plurality of winding guide portions.

8. The armature according to claim 6, wherein an axial extent of the radially outer side reinforcing portion is smaller than that of the winding guide wall.

9. The armature according to claim 6, wherein:

the winding guide wall of the at least another one of the plurality of winding guide portions has two circumferentially opposed side wall sections; and at least a portion of a corresponding one of the two circumferentially opposed side wall sections is circumferentially spaced from the radially elongated main body of an adjacent one of the plurality of the teeth in the circumferential direction on one circumferential side of the at least another one of the plurality of winding guide portions where the radially outer side reinforcing portion is located.

10. The armature according to claim 1, wherein the plurality of slots is generally identically configured.

11. An electric motor comprising the armature of claim 1.

* * * * *